United States Patent [19]

Johnson, Jr. et al.

[11] Patent Number: 5,185,536
[45] Date of Patent: Feb. 9, 1993

[54] UNINTERRUPTIBLE POWER SUPPLY HAVING IMPROVED BATTERY CHARGER

[75] Inventors: Robert W. Johnson, Jr., Raleigh; Joseph C. Paulakonis, Chapel Hill, both of N.C.

[73] Assignee: Exide Electronics, Raleigh, N.C.

[21] Appl. No.: 766,762

[22] Filed: Sep. 27, 1991

[51] Int. Cl.$^5$ .............................................. H02J 7/02
[52] U.S. Cl. ........................................ 307/66; 307/64; 363/37
[58] Field of Search .............................. 363/37, 95-98; 307/64-66

[56] References Cited

U.S. PATENT DOCUMENTS

| | | | |
|---|---|---|---|
| 4,395,639 | 7/1983 | Bring | 307/66 |
| 4,473,756 | 9/1984 | Brigden et al. | 307/66 |
| 4,694,194 | 9/1987 | Hansel et al. | 307/66 |

OTHER PUBLICATIONS

Ralph E. Tarter, *Principles of Solid-State Power Conversion*, Howard W. Sams & Co., Inc., 1985, pp. 392-393.

Primary Examiner—Emanuel T. Voeltz
Attorney, Agent, or Firm—Woodcock Washburn Kurtz Mackiewicz & Norris

[57] ABSTRACT

An UPS apparatus with a back-up battery and successively coupled rectifier, inverter and output filter circuits, having an improved battery charging circuit. The charging circuit has a transformer with its primary winding being part of the output filter, and its secondary winding driving a second rectifier circuit which produces the charging current. The charging circuit contains an impedance preferably connected between the transformer secondary winding and the second rectifier circuit, for capturing only a high frequency portion of the signal from the inverter stage, thereby enabling the utilization of smaller charger circuit elements.

11 Claims, 2 Drawing Sheets

UNINTERRUPTIBLE POWER SUPPLY HAVING IMPROVED BATTERY CHARGER

BACKGROUND OF THE INVENTION

1. Field of the Invention

This invention relates to uninterruptible power supplies, and, more particularly, to such power supplies having separate charging circuits for charging of the back-up battery supply.

2. Description of the Prior Art

Uninterruptible power supply (UPS) equipment has been produced for many years. Such UPS devices are widely known and used in the art for providing power to loads, such as computers, where AC power loss cannot be tolerated. Thus, in the computing environment, AC power loss results in loss of data and programs running on the computer system at the time of the loss. Moreover, loss of AC power can sometimes result in damage to computer system components. It is recognized that in such environments, and in other applications where power must be maintained, that even momentary loss of power, e.g., less than one cycle of the line current, can result in significant damage, due to loss of data, etc. Prior art UPS devices thus provide large battery packs, or back-up battery supplies, to source power for a relatively short period of time. For a variety of reasons, including size of the UPS, it is important to have an overall UPS design which minimizes the size and complexity of the battery charger. The more complex the battery charger is, the larger and more costly the UPS needs to be.

In prior art designs generally, each UPS has an internal charger designed to recharge the batteries after utility failure has occurred. Thus, in a traditional UPS design, having a rectifier circuit and inverter circuit, the battery is connected to the output of the rectifier, and to the input of the inverter, as illustrated in the prior art design of FIG. 1(a). The rectifier circuit includes a switching circuit, for providing regulated DC from the unregulated utility voltage. In this arrangement, the battery receives the regulated rectified voltage from the rectifier, and supplies power to the inverter in the case of power line loss. The inverter performs the task of changing the power back to AC at power line voltage, for connection to the load. The inverter typically has a PWM (pulse wave modulation) circuit, the switching pattern of which has high frequency components. These components are removed by an LC output circuit, such that the resultant wave form is the fundamental, namely a sine wave. A known problem with this type of prior art circuit is that the rectifier must have the capacity to supply the full system rating plus whatever additional amount is required to recharge the batteries. If the battery charger circuit is complex and draws a high current, this requires use of larger high power components in the rectifier, increasing the cost of the system.

Lower cost prior art systems modify the basic UPS approach by disconnecting the battery from the rectifier during normal operation. As seen in FIG. 1(b), the rectifier network is replaced by two elements, namely an unregulated rectifier network to process the major power component, and a charger circuit to recharge the batteries. By this technique, the charger can be reduced in size, achieving some cost savings. Such charger is, however, traditionally of the phase control type, and contains the basic elements including a voltage transformer for providing isolation from the utility lines and matched voltage to the battery voltage; solid state switches to control the conduction of current from the voltage transformer; an inductor to filter and provide an impedance to limit charge current; and a control circuit that regulates the conduction period of the solid state switches to effect battery charging voltage and charging current control. Thus, the charger circuit duplicates much of the circuitry for providing the main power output. The provision of such a separate charger adds substantially to the cost of the system.

There is thus a need in the art for a UPS having a battery charger circuit which does not duplicate the steps of the main power processing elements, i.e., the power factor correction circuits and inverter circuits which precondition the power drawn from the utility. What is needed is a charger design which utilizes as much of the standard power processing circuitry as possible, and yet provides a low component isolated battery charger for providing high current recharging to the battery supply.

SUMMARY OF THE INVENTION

The present invention provides a UPS having a battery charging circuit taking its power input from the conventional output of a standard rectifier-inverter UPS. A transformer input winding is provided as part of the inductance in the output circuit, the secondary of the transformer being connected to a rectifier bridge which in turn provides DC charging current for the battery. The transformer provides isolation of the charger circuit from the power mains, and selection of the transformer windings ratio adjusts the voltage across the rectifier to the desired voltage. Impedance is connected in the charger circuit, preferably between the transformer secondary winding and the rectifier bridge, to capture a high frequency component produced across the effective output inductance by the inverter, thereby providing high frequency current pulses. By using the high frequency portion of the voltage wave form, smaller circuit elements can be utilized, resulting in lowered costs. Charging is further controlled in an on/off fashion by a circuit that monitors the battery voltage and opens a switch when the battery voltage is above a first voltage, and closes the switch when the battery voltage drops below a second lower voltage.

DESCRIPTION OF THE PREFERRED EMBODIMENT

Figure 1A:
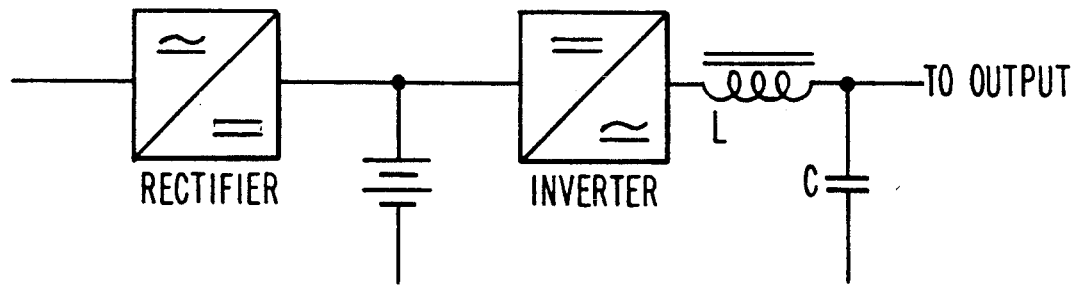
FIG. 1A is a simplified diagram showing the primary circuit components of a prior art UPS.
Figure 1B:
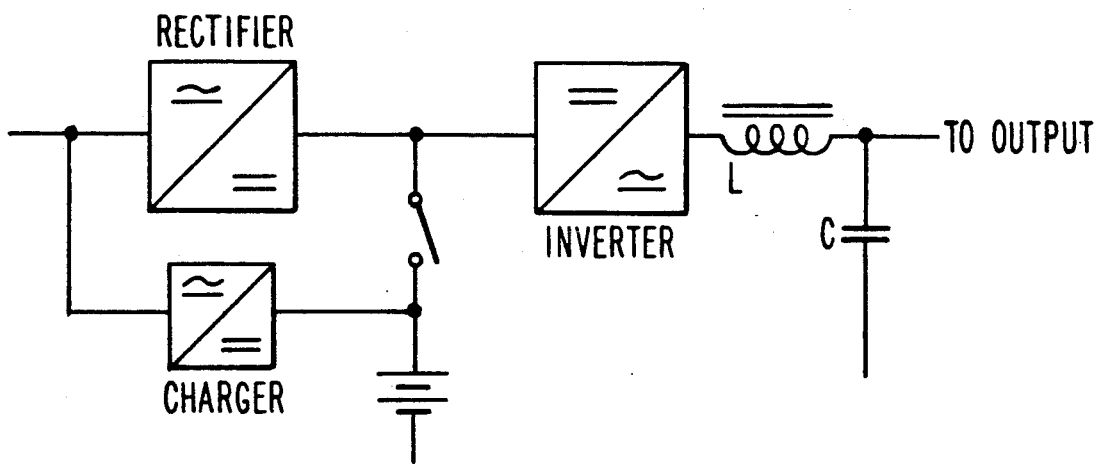
FIG. 1B is a simplified diagram showing the primary circuit components of a prior art UPS having a separate battery charger circuit.
Figure 2:
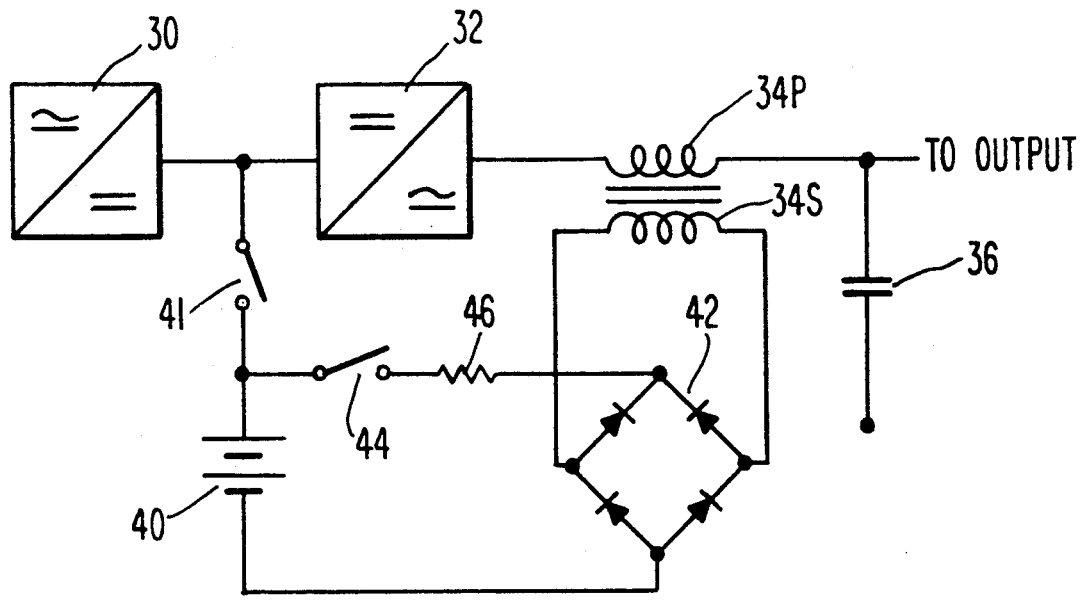
FIG. 2 is a circuit diagram showing the primary features of a UPS of this invention, having a battery charger circuit deriving its drive signal from the output of the inverter circuit.

Referring now to FIG. 2, there is illustrated a first embodiment of the invention utilizing a circuit adapted for low frequency charging. As with the prior art, the UPS comprises a rectifier circuit 30, the output of which is coupled to the input of an inverter circuit 32. The output filter circuit comprises an inductor 34P and a capacitor 36, the load being connected across the capacitor. The inductance value of 34P, in combination with capacitor 36, comprises a filter which effectively provides the fundamental (power line) AC frequency to the load. This is thus a low pass filter that eliminates the carrier frequency introduced by the inverter. Both the high frequency components introduced by the inverter, and the lower frequency voltage components, appear across winding 34P. In this invention, all or part of inductance 34P comprises a primary transformer winding, the secondary being shown as 34S. This transformer provides voltage transformation and isolates the output circuit from the battery charging circuit, thereby simplifying the charging circuit. In the simple configuration of FIG. 2, the voltage across secondary 34S is placed across a diode bridge circuit 42, which in turn is connected through switch 44 and limit impedance 46 to the battery 40. The series impedance 46 may be connected either before or after the diode rectification, and it is a matter of design selection as to whether it is an AC or DC limiting impedance. Switch control 44 is used in a conventional way to provide on/off control of battery charging, e.g., switch position is controlled as a function of battery voltage, and is closed when voltage drops below a first (lower) voltage and opened when it gets above a second (higher) voltage. Switch 41 is normally open, and is closed immediately upon sensing of a loss of line power, in a conventional manner. Thus, it is to be understood that block 41 comprises conventional monitoring circuitry for sensing when the power line has failed and the battery has to be switched into the circuit.

Figure 3:
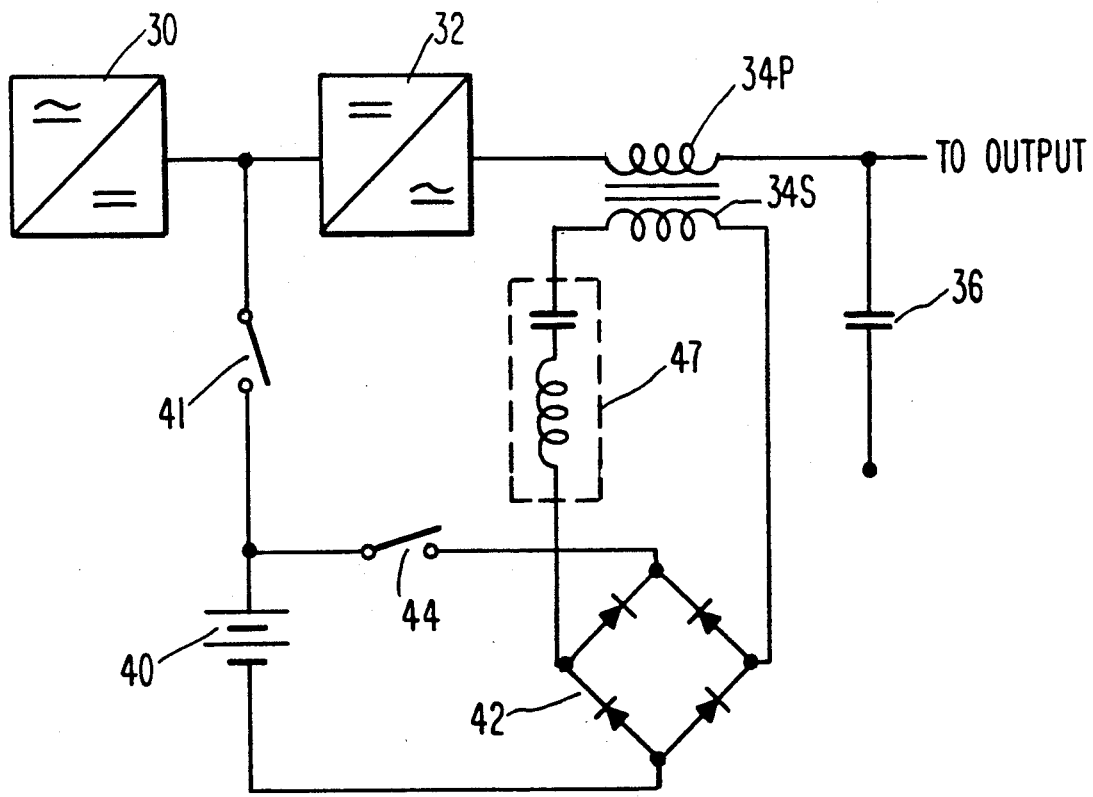
FIG. 3 is a diagram showing the basic circuit components of the preferred embodiment of the UPS invention, wherein the charging circuit utilizes an impedance designed to provide high frequency charging.

Referring now to FIG. 3, there is shown a variation which comprises a preferred high frequency charging arrangement. In this battery charger, the series impedance 47 constitutes an LC circuit connected between the secondary winding 34S and the diode bridge. The impedance constitutes a series resonant circuit, the frequency of which is selected to be higher than the carrier frequency. The inductance value of this resonant circuit may be combined into inductance 34S as leakage inductance between 34P and 34S, or may be a separate component. This produces current pulses at the rate of the inverter PWM and with a shape corresponding to the resonance frequency of the impedance, without impairing delivery of rated power to the load. Since a high frequency is utilized, the charger circuit elements can be small, and of lower cost.

It is seen that the UPS design of this invention maximizes the use of existing parts and components required to provide the output power, and provides an isolated and separate battery charger circuit which is simple and efficient, and enables reliable charging. It is to be understood that the invention is not limited in terms of the design of the UPS prior to the output circuit, such that the rectifier 30 and inverter 32 circuits can have any design of desired complexity or simplicity.

What is claimed:

1. An uninterrupted power supply for delivering power from a power line to a load, having a back-up battery supply, power processing means for rectifying and inverting the power line signal, filter output means continuously connected to said power processing means for continuously connecting a filtered power output to said load under all power line conditions, and a charging circuit for charging said back-up battery supply, characterized by
said charging circuit comprising a transformer having a primary winding which is part of said filter output means and a secondary winding for producing a charging signal, and charger rectifier means for rectifying and connecting said charging signal from said secondary winding to said back-up battery supply.

2. The uninterrupted power supply as described in claim 1, wherein said filter output means comprises a circuit inductance and capacitance, and wherein said circuit inductance comprises said primary winding.

3. The uninterrupted power supply as described in claim 2, wherein said power processing means comprises a rectifier circuit having an input adapted to be connected to said power line and having an output, and an inverter circuit having an input connected to the output of said rectifier circuit, and further comprising switching means for switching said back-up battery supply to provide the output of said battery supply to the input of said inverter circuit in the event of loss of power on said power line.

4. The uninterrupted power supply as described in claim 2, wherein said inverter provides an output containing high frequency components, and wherein said charging circuit comprises an impedance for limiting the power output from said secondary winding substantially to a high frequency component from said inverter circuit.

5. The uninterrupted power supply as described in claim 4, wherein said charging circuit comprises a second switch means for providing on/off control of the charging of said back-up battery supply.

6. The uninterrupted power supply as described in claim 4, wherein said impedance is connected between said secondary winding and said charger rectifier means.

7. The uninterruptible power supply as described in claim 6, wherein said impedance comprises an LC series circuit.

8. A UPS having converting means for converting DC power to AC power, an output circuit connected to said converting means for continuously delivering said converted AC power to a load under all operating conditions, said output circuit having an inductance, a DC battery source for providing DC power to said converting means and a charger circuit for charging said DC battery source, wherein
said inductance comprises a primary winding of a transformer, and said charger circuit comprises a secondary winding of said transformer.

9. The UPS as described in claim 8, wherein said charger circuit comprises a rectifier bridge.

10. The UPS as described in claim 8, wherein said converting means comprises switching circuitry that switches at a high switching frequency, and said output circuit comprises capacitor means for providing thereacross a signal which is substantially sinusoidal at power line frequency.

11. The UPS as described in claim 10, wherein said charger circuit comprises an impedance which passes current substantially only at a high frequency greater than said high switching frequency.

* * * * *